Nov. 29, 1949 L. W. MUELLER 2,489,660
GAS METER SETTER FOR CURB BOX METERS
Filed Sept. 5, 1947 2 Sheets-Sheet 1
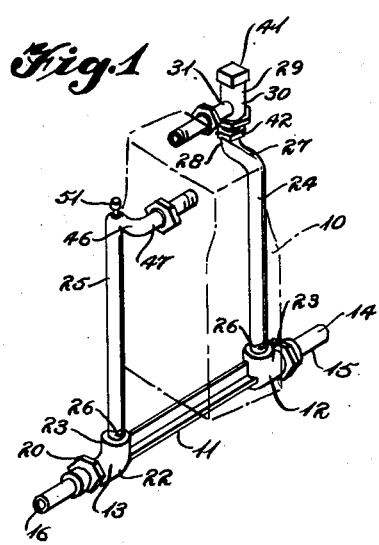
Inventor
Lucien W. Mueller
By Cushman Darby Cushman
Attorneys Nov. 29, 1949     L. W. MUELLER     2,489,660
GAS METER SETTER FOR CURB BOX METERS
Filed Sept. 5, 1947     2 Sheets-Sheet 2
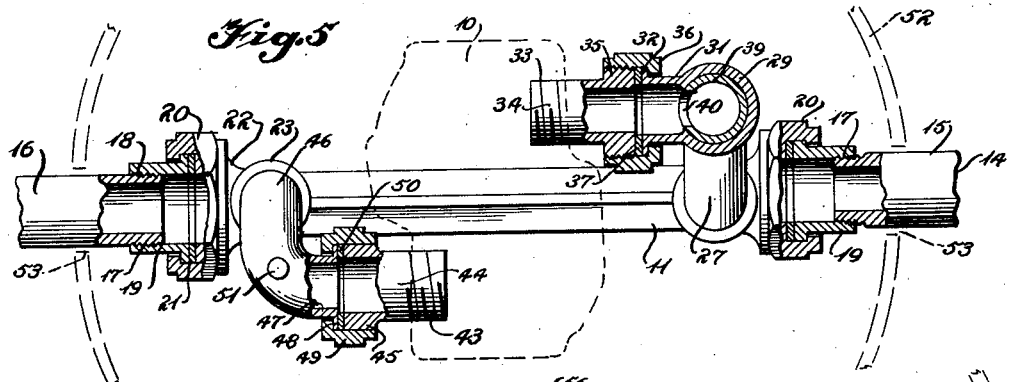
Inventor
Lucien W. Mueller
By Cushman Darby Cushman
Attorneys Patented Nov. 29, 1949

2,489,660

UNITED STATES PATENT OFFICE 2,489,660

GAS METER SETTER FOR CURB BOX METERS

Lucien W. Mueller, Decatur, Ill., assignor to Mueller Co., Decatur, Ill., a corporation of Illinois Application September 5, 1947, Serial No. 772,300

3 Claims. (Cl. 285—3)

The present invention relates to an improved gas meter setter for curb box meters.

In certain localities gas meters are installed in boxes set below ground level and adjacent the curb or street so as to be accessible for inspection and repair. In such installations the meter is usually suspended at one side of the box and the inlet and outlet of the meter are offset from each other, as viwed from the top, but are in the same horizontal plane, thus placing a torsional strain on the pipe connections. Moreover, in such meter connections it is difficult to remove the meter for testing or repair, or to fit it into a cut in the gas service line.

Accordingly, an important object of the present invention consists, in providing a gas meter setter for curb box meters provided with means for connecting the meter to the service pipes so that the meter can readily be removed for testing or repairing, and may also be replaced without difficulty, and cut into a suply line at a minimum expenditure of time and effort.

A further object consists in providing a gas meter setter with means which preferably suspends the meter substantially centrally of the service pipes so as to obviate torsional strain on the pipe connections. Additionally, the gas meter setter is so constructed that when it is desired to remove a tin or ordinary cast iron meter from a house and install a curb box meter, the service line may be cut at any desired point and the meter setter installed so as to be readily accessible for inspection or repair and can easily be replaced when necessary.

Other objects and advantages of the invention will become apparent from the following description when taken in conjunction with the accompanying claims and drawings.

Referring to the drawings in which are shown several preferred embodiments of the invention:

Figure 1 is a perspective view of the meter setter constructed in accordance with the present invention.

Figure 1a is an enlarged detail sectional view of the angle stop shown in Figure 1.

Figure 2 is a perspective view of a modified form of meter setter.

Figure 3 is a perspective view of a further modification.

Figure 4 is a perspective view of another form of the invention.

Figure 5 is an enlarged sectional plan view of Figure 1.

Figure 6 is an enlarged plan view of Figure 3, and

Figure 7 is an enlarged plan view of Figure 4.

Referring to the drawings and more particularly Figures 1 and 5, the gas meter 10 is shown arranged to be associated with a meter setter which preferably comprises a transverse bar or yoke 11 to which is secured at each end thereof in any suitable manner such as by welding, soldering or the like, the elbows 12 and 13. The gas service line 14 is cut at the desired point where the meter is to be installed so as to provide a supply pipe 15 leading from the gas main and a service pipe 16. The inner opposed ends of the pipes 15 and 16 are externally threaded as at 17 (Fig. 5) to receive the intrenal threads 18 of the flanged connectors or sleeves 19 with which are associated rotatable flanged coupling nuts 20 that are threaded as at 21 to the external threads on the horizontal portions 22 of the elbows so as to establish communicating connections of the pipes 15 and 16 therewith. Extending upwardly from the vertical portions 23 of the elbows 12 and 13 and disposed on opposite sides of the meter 10, are conduits or pipes 24 and 25, preferably formed of copper and externally threaded at their lower end, as at 26, so as to be connected to the internal threads in the vertical portions of the elbows. The conduit 24 communicates through its associated elbow with the supply pipe 15 and is bent laterally as at 27 and may terminate in an upper end portion 28 to which is connected an angle stop or valve 29 (Fig. 1a) having a hollow tapered vertical body or portion 30 that is interiorly threaded at its lower end as at 30' to receive the complementary external threads of a coupling nut 42 to which the upper end of the conduit 24 is secured in any suitable manner such as welding or the like. A tubular arm 31 extends laterally from one side of the body 30 and has its outer end terminating in an annular flange 32 (Fig. 5). The side of the meter 10 adjacent the arm 31 is preferably provided with a threaded tapped opening 33 to which is connected one end of a threaded nipple 34 that has at its opposite or outer end an enlarged externally threaded head 35 so as to be detachably connected to the arm 31 by the coupling nut 36. Preferably a gasket 37 is positioned between the flange 32 and the adjacent side of the head 35 to provide a tight seal when the parts are set up.

The angle stop 29 is arranged to control the flow of the gas from the supply pipe 15 and the conduit 24 into the meter 10, and preferably includes a rotatable plug 38 in the body 30 of the stop. The plug 38 is provided with a lower tubular tapered portion 39 (Fig. 1a) that has an opening 40 in one side thereof which is arranged upon rotation of the plug 38 to register with the horizontal tubular arm 31 of the stop so as to establish communication of the conduit 24 with the meter and to cut off the supply when the opening 40 is moved or turned away from the arm 31. The upper end of the plug 38 projects outwardly from the stop and has thereon a head 41 of polygonal shape so as to receive a suitable tool for turning the plug to control the flow of gas into the meter. The head 41 may be detachably connected to the plug 38 by any suitable means such as the pins or screws 41'. A flat annular spring 40' may be interposed between the top of the body 30 and the head 41 to facilitate removal of the head 41 from the stop or valve 29 when the pins 41' are withdrawn. The side of the meter 10 opposite the tapped opening 33 is provided with a similarly tapped opening 43 (Fig. 5) to which is connected an externally threaded nipple 44 having an enlarged outer end or head portion 45. The upper portion of the outlet conduit 25 is bent laterally as at 46 and terminates in an inwardly extending externally threaded end portion 47 provided with an external flange 48 that is connected to the head 45 of the nipple 44 by the flanged coupling nut 49. A packing or gasket 50 serves to provide a tight seal when these parts are clamped together by the coupling nut 49. A small bleeder valve 51 may be connected to the outlet conduit 25 through which a sufficient amount of gas may be allowed to escape so as to ascertain if the meter is in operation.

It will be noted that the spaced conduits 24 and 25 constitute means for suspending or supporting the meter 10 above the bar 11 and that the meter extends transversely of the bar 11 and substantially centrally thereof. As clearly shown in Figure 5, the inlet nipple 34 and its associated parts are located on one side of the bar 11 while the nipple 44 and its associated parts are positioned on the opposite side of this bar with the result that the meter can be readily removed for testing or repairing and can be replaced without difficulty and at a minimum expenditure of time and effort. Additionally, the bar 11 co-acts with the conduits 24 and 25 to constitute a meter setter that can be expeditiously connected into a service line by cutting out a section of the service pipe 14 at the desired point. As the meter 10 is suspended substantially centrally of the bar 11 and the pipes 15 and 16, it will be maintained in proper balanced position and thus be free from torsional strains and vibrations to which the pipe connections are usually subjected. The meter setter and its associated parts are housed in a cylindrical curb box 52 having diametrically disposed openings 53 through which extend the supply pipe 15 and the service pipe 16 and may be located at any point near the curb or street so as to communicate with the gas line main.

The form of the invention shown in Figure 2 is substantially similar to that disclosed in Figure 1, with the exception that the inlet conduit 24, instead of being provided with an angle stop, has an intermediate portion 27 bent upwardly as at 54, and terminating in an inwardly disposed externally threaded end 55 that is connected to the inlet nipple 34 of the meter 10 by a flanged connection and a flanged coupling nut 56 in a manner similar to the coupling nut connection 49 (Fig. 5). The outlet conduit 25 and its associated parts are similar in construction and operation to the corresponding parts previously described.

In the modification shown in Figure 3 the parts are substantially the same as those disclosed in Figure 2, with the addition of a pressure regulator 57 which is connected through a tubular sleeve 58 with the inlet conduit 24 so as to communicate therewith, and may be held in a fixed position by any suitable means such as the set screw 59. Instead of providing an angle stop such as 29 (Fig. 1) the supply pipe 15 may be provided with a control valve or shut-off 60 which is installed in the service line ahead of the regulator 57, so that the gas can be shut off at both the regulator and the meter when desired. The curb meter 61, instead of being of cylindrical shape, may be elliptical or oval so as to accommodate the regulator 57. The bleeder valve 51 (Fig. 1) is omitted, and, if desired, the meter setter shown in Figures 1 and 5, may have substituted for the bleeder valve on the outlet conduit 25, a regulator similar to the regulator 57. The conduits 24 and 25, as shown in Figures 2 and 3, are of the same length and each is offset an equal distance on opposite sides of the bar 11, and the meter connecting nipples 34 and 44 are disposed in the same horizontal plane.

In the modification shown in Figures 4 and 7, the gas meter 10 is arranged to communicate with the service pipe 15 and the supply pipe 16 through a transverse bar or yoke 62, to the ends of which are soldered or otherwise connected the elbows 63 and 64. These elbows have their horizontal portions externally threaded as at 65 to receive the complementary internal threads on the flanged coupling nuts 66 which are formed similar to the nuts 20 (Fig. 5) so as to be rotatably connected to the flange connectors 67 that are internally threaded to be attached to the external flanges on the inner ends of the pipes 15 and 16, respectively. The vertical tubular arm of the elbow 63 is threaded to the lower end of an inlet conduit or pipe 68 which is bent laterally as at 69 and has its upper end bent inwardly, as at 70, so as to be connected to a threaded nipple 71 which extends outwardly from a tapped opening 72 in one side of the meter and is detachably connected to the conduit 68 through a coupling nut 73 in a manner similar to the coupling nut connection 36 (Fig. 5). An outlet conduit 74 is connected at its lower end to the vertical tubular arm of the elbow 64 and has an intermediate bent portion 75 which terminates in an inwardly upper end portion 76 that is connected through a coupling nut 77 with an externally threaded nipple 78 that extends outwardly from a tapped threaded opening 79 in the wall of the meter opposite the opening 72. The upper opposed ends 70 and 76 of the inlet and outlet conduits are located on the same side of the bar 62, and are connected to the meter on opposite sides of the transverse center line thereof. The meter setter and its associated parts are housed in a curb cylindrical box 80 that may be set in the ground at a point near the curb or sidewalk. It will be noted that the nipples 71 and 78 are disposed on opposite sides of the transverse center line of the meter 10 and that the inlet conduit 69 and the outlet conduit 74 constitutes suspension means for supporting the meter above the bar 62. The meter 10 also is laterally off-set relative to the bar 62 and the pipes 15 and 16, as contrasted to the central suspension of the meter in the forms previously described. The bar 62 and elbows 63 and 64 co-act with the conduits 68 and 74 to provide a gas meter setter for communicating the supply pipe 15 and service pipe 16 to the meter on opposite sides of the transverse center line of the meter, and in such a manner that the meter is readily accessible for inspection or repair and can readily be cut into a gas supply line. Manifestly, the inlet conduit may be modified by connecting either or both the angle stop 30 (Fig. 1) or the regulator 57 (Fig. 3) thereto, if such connections are thought desirable.

As shown in all forms of the invention, the inlet conduit and the outlet conduit formed on opposite sides of the meter are disposed in substantially the same horizontal plane but are axially offset and parallel to each other as shown in Figures 5, 6 and 7. Additionally, the inlet and outlet conduits which connect the setter bar to the meter are each provided with double offsets, one of which extends transversely toward the setter bar and the other of which is disposed substantially parallel to the setter bar, with the result that the meter setter provides simple, efficient and positive means for quickly installing or removing a meter from the service line. Additionally, the meter setter is so constructed that a tin or cast iron meter from a house or the like may be removed and a curb box meter installed outside of the house efficiently and economically and at a minimum expenditure of time and effort and be cut into the service line at any desired point. Thus, it will be seen that the meter setter provides a triple off-set arrangement in which the vertical pipes at their upper ends are formed with a double off-set, one of which off-sets is disposed transversely away from the bar 11 and the other extends substantially parallel to this bar. Moreover, in certain forms of the invention, the double off-sets are positioned so that the inlet and outlet meter coupling ends of the pipes are at substantially an equal distance on opposite sides of the bar 11, while in other forms the coupling ends of the pipes are of different lengths and extend laterally from the bar in the same direction.

It will be understood that the forms of the invention shown and described are merely illustrative of preferred embodiments and that such changes in construction and operation are contemplated as come within the purview of the following claims.

I claim:

1. In combination with a gas meter having an inlet opening in one side and an outlet opening in its opposite side, said openings being in substantially the same horizontal plane and parallel but axially offset from each other, a setter bar positioned below said meter and having an inlet elbow at one end and an outlet elbow at its opposite end, means connecting a supply pipe to said inlet elbow, means connecting a service pipe to said outlet elbow, an inlet conduit extending upwardly from said inlet elbow and having a double offset including an intermediate angularly disposed portion extending transversely toward said bar and an inwardly extending upper end portion disposed substantially parallel to said bar and connected to said inlet opening, and an outlet conduit extending upwardly from said outlet elbow and having a double offset including an intermediate angularly disposed portion extending transversely toward said bar and an inwardly extending upper end portion substantially parallel to said bar and connected to said outlet opening.

2. In combination with a gas meter, a meter setter as called for in claim 1 in which the intermediate angularly disposed portions of the inlet and outlet conduits extend in opposite directions from the setter bar.

3. In combination with a gas meter, a meter setter as called for in claim 1 in which the intermediate angularly disposed portions of the inlet and outlet conduits extend from the same side of the setter bar.

LUCIEN W. MUELLER.

REFERENCES CITED

The following references are of record in the file of this patent:

UNITED STATES PATENTS

| Number | Name | Date |
| --- | --- | --- |
| 943,330 | Yearke | Dec. 14, 1909 |
| 1,298,596 | Stevens | Mar. 25, 1919 |
| 1,988,003 | Ford | Jan. 15, 1935 |